United States Patent [19]

Baruschke et al.

[11] Patent Number: 5,099,654
[45] Date of Patent: Mar. 31, 1992

[54] METHOD FOR CONTROLLING A MOTOR VEHICLE AIR CONDITIONING SYSTEM

[75] Inventors: Wilhelm Baruschke, Wangen; Roland Burk, Kornwestheim; Hans-Joachim Ingelmann, Iggingen; Hans Kampf, Karb; Josef Kern, Alfdorf; Karl Lochmahr, Vaihingen; Rolf Wallner; Reinhold Weible, both of Stuttgart, all of Fed. Rep. of Germany

[73] Assignee: Sueddeutsche Kuehlerfabrik Julius Fr. BEHR GmbH & Co. KG, Stuttgart, Fed. Rep. of Germany

[21] Appl. No.: 353,368

[22] Filed: May 17, 1989

Related U.S. Application Data

[63] Continuation-in-part of Ser. No. 159,339, Feb. 23, 1988, abandoned.

[30] Foreign Application Priority Data

Feb. 26, 1987 [DE] Fed. Rep. of Germany ....... 3706152

[51] Int. Cl.$^5$ ..................... F25D 17/00; F25B 1/00
[52] U.S. Cl. ......................... 62/180; 62/183; 62/186; 62/225; 62/228.5
[58] Field of Search ............... 62/133, 228.1, 228.3, 62/228.4, 228.5, 225, 183, 184, 186, 180; 417/212

[56] References Cited

U.S. PATENT DOCUMENTS

| | | | |
|---|---|---|---|
| 2,705,404 | 4/1955 | Malutich | 62/181 X |
| 3,183,964 | 5/1965 | Spivey | 165/28 |
| 3,315,730 | 4/1967 | Weaver | 165/23 |
| 3,861,829 | 1/1975 | Roberts et al. | 417/212 X |
| 4,283,919 | 8/1981 | Vakil | 62/114 |
| 4,325,223 | 4/1982 | Cantley | 62/126 |
| 4,438,635 | 3/1984 | McCoy, Jr. | 62/305 |
| 4,459,819 | 7/1984 | Hargraves | 62/225 X |
| 4,473,109 | 9/1984 | Kojima et al. | 165/12 |
| 4,482,007 | 11/1984 | Yoshimi et al. | 165/21 |
| 4,510,763 | 4/1985 | Johnson | 62/228.3 X |
| 4,570,450 | 2/1986 | Takemi et al. | 62/199 |
| 4,582,124 | 4/1986 | Yoshimi et al. | 165/28 |
| 4,596,123 | 6/1986 | Cooperman | 62/199 |
| 4,616,484 | 10/1986 | Mehdi et al. | 62/180 |
| 4,646,535 | 3/1987 | Matsuoka et al. | 62/228.5 |
| 4,667,480 | 5/1987 | Bessler | 62/228.4 X |
| 4,711,094 | 12/1987 | Ares et al. | 62/90 |
| 4,848,100 | 7/1989 | Barthel et al. | 62/228.3 X |

FOREIGN PATENT DOCUMENTS 0038188 10/1981 European Pat. Off. .

Primary Examiner—Harry B. Tanner
Attorney, Agent, or Firm—Foley & Lardner

[57] ABSTRACT

A method for controlling a motor vehicle air conditioning system is described. The motor vehicle air conditioning system comprises a refrigeration circuit including a refrigerant compressor, a condenser, an evaporator and a throttle device arranged upstream of the evaporator. The condenser is associated with a ventilating fan and the evaporator is associated with a blower. The compressor capacity, the condenser capacity and the evaporator capacity are directly or indirectly sensed by sensor means and supplied as electrical variables to an electronic control circuit which logically combines these input signals and generates output signals in dependence on at least two of these capacity values and including further parameters. The control circuit acts on electrically controllable actuators for influencing the compressor capacity, the condenser capacity and/or the evaporator capacity.

37 Claims, 13 Drawing Sheets

| TABLE 1 | | |
|---|---|---|
| Formula Symbols | Designation | Determination |
| $n_{L\,so\,ll}$ | Set value - fan rp, | Calculated value |
| $t_{RK_s}$ | Saaturation temperature (condenser) | Sensor 68 |
| $t_{KW}$ | Coolant temperature | Sensor 33 |
| $n_L$ | Rpm transducer | Sensor 32 |

| TABLE 2 | | |
|---|---|---|
| Formula symbol | Designation | Determination |
| $t_{VL\,soll}$ | Set value - evaporator temperature | Calculated value |
| $Y_l$ | Set value - Internal temperature control (left) | Calc. Value |
| $Y_r$ | Set value - Internal temperature control (right) | Calc. Value |
| $t_{VL}$ | Evaporator temperature | Calc. Value |
| $Y_{AC}$ | Set value - compressor control | Calc. Value |
| $t_{RC_s}$ | Hot gas temperature sensor | Sensor 54 |
| $t_{RC_s\,max}$ | max. permissible hot gas temperature | constant |
| $n_C$ | Rpm transducer (compressor) | Sensor 14 |
| $n_M$ | Rpm transducer (motor) | Sensor 7 |
| ü | translation ratio | constant |

| TABLE 3 | | |
|---|---|---|
| Formula symbol | Designation | Determination |
| $\Delta t_{üsoll}$ | Set value - overheating | Calc. value |
| $t_{RC_s}$ | Hot gas temperature sensor | Sensor 54 |
| $t_{VL}$ | Evaporator temperature | Calc. Value |
| $n_C$ | Rpm transducer (compressor) | Sensor 14 |
| $Y_{AC}$ | Set value - compressor control | Calc. value |
| $P_{RV_s}$ | Suction pressure sensor | Sensor 45 |
| $t_{PV}$ | Saturation temperature (evaporator) | Sensor 68 |
| $t$ | Time after AC "in" | Calc. value |
| $t_{Start}$ | Time for start opening | constant |
| $t_{RV_s}$ | Suction tube temperature sensor | Sensor 52 |
| $\Delta t_ü$ | Overheating | Calc. value |
| ExV | Injection valve | Sensor 23 |

METHOD FOR CONTROLLING A MOTOR VEHICLE AIR CONDITIONING SYSTEM

This is a continuation-in-part of Ser. No. 07/159 339, filed Feb. 23 1988, abandoned.

BACKGROUND OF THE INVENTION

The invention relates to a method and apparatus for controlling a motor vehicle air conditioning system. A motor vehicle air conditioning system of the known type is described, for example, in EP-PS 0 038 188. Such systems, in addition to the actual control system for the motor vehicle air conditioning system, other separate open-loop or closed-loop control systems exist for individual components in the motor vehicle which can also influence the temperature of the internal space in the vehicle but are completely independent of the actual air conditioning control system. This primarily includes a protection circuit for preventing evaporator icing which causes the compressor to be switched off, a high-pressure or hot gas temperature protection circuit which also acts on the compressor drive or a corresponding clutch, and a cooling water temperature control which causes the radiator fan to be connected or disconnected. Each of these interventions, which take place independently of the actual air conditioning control for the internal vehicle space, influence the capacity of the air conditioning system and thus the air temperature which is supplied to the internal vehicle space via the air conditioning system, thereby also influencing the temperature level in the passenger space.

In addition, refrigeration circuits in vehicles are always subject to alternating boundary conditions such as, for example, drive speed, cooling conditions at the condenser, charging of the evaporator with air and refrigerant, acceleration forces and refrigeration capacity requirement. With separate open-loop or closed-loop control systems, this leads to the compensation of one disturbance variable in one control loop acting as disturbance variables in one or more of the remaining control systems which leads not only to an extremely high switching frequency and extreme burden on the components but also to poor efficiency.

SUMMARY OF THE INVENTION

It is the object of the invention, therefore, to develop a method for controlling a motor vehicle air conditioning system whereby the refrigerating capacity of the system is optimized and the relevant function of the units influencing the operating mode of the air conditioning system is included in the control characteristic.

It is also the object of the invention to create a motor vehicle air conditioning system for carrying out the disclosed method.

In a method for controlling a motor vehicle air conditioning system of the type mentioned, this object is achieved by the fact that the compressor capacity, the condenser capacity and the evaporator capacity are directly or indirectly sensed by sensor means and supplied as electrical variables to the input terminals of a common electronic control circuit. The input signals of the capacities are logically combined and, in dependence on at least two of capacity values and on the inclusion of the parameters for the refrigerating capacity requirement, evaporator icing, final compression temperature and hydraulic shock, output signals are generated which are supplied to electrically drivable actuators for influencing the compressor capacity, the condenser capacity and/or the evaporator capacity.

The essential advantages of the invention can be seen, in particular, in the optimum process control of the overall system and the especially good air conditioning comfort of the internal vehicle space. The fact that process control is optimum improves the efficiency of the individual components and, in addition, critical operating states are avoided and the switching frequency of the compressor drive is significantly reduced. The switch-on shocks of the compressor and temperature fluctuations of the air fed into the passenger compartment, which are frequently felt to be unpleasant, are thereby avoided.

The following measures can still be optionally taken to achieve further optimization with respect to the capacity requirement, the reduction in switching frequency, the coupling and the avoidance of switch-on shocks:

to influence the compressor capacity, the geometric delivery volume is changed by directly changing the stroke or by controlling the closing time of the compression space, the speed of the compressor is controlled, the rate of charging of the compressor is controlled by means of variable output throttling.

According to a preferred embodiment of the invention, the air throughput through the condenser is controlled in order to influence the condenser capacity by controlling the rotational speed of the ventilating fan or by means of a louvered shutter operated by an actuating motor. An optimum interaction of the condenser with its environment, particularly the radiator tank for the engine cooling water, is achieved by this measure.

To improve the air conditioning comfort, it is advantageous that the air throughput through the evaporator is also controlled as a result of controlling the rotational speed of the blower in order to influence the evaporator capacity. There are several possibilities for controlling the rotational speed of the condenser ventilating fan; however, clutches or drives providing continuous controllability are preferred. A technically simple continuous closed-loop control with low power dissipation is obtained with a quasi-steady-state drive to the drive systems, that is to say when driving them with, for example, a pulse width modulated rectangular signal which, in conjunction with the inertia of the drive systems or the control system, leads to a quasi-steady control result. So that the unavoidable switching losses in the control circuit and in the drive systems remain as low as possible and to provide the possibility of electric and radio interference proofing with little expenditure, it is proposed that the control characteristic for controlling the ventilating fan motor or the blower motor is quasi-steady, the pulse frequency of the signal being <1000 Hz, preferably <100 Hz.

If powerful pressure disturbances exist and/or little installation space is available for the ventilating fan drive, it is an advantage that the ventilating fan be hydrostatically driven and, for controlling the rotational ventilating fan speed, the electric control circuit supplies continuous or quasi-continuous output signals to an electromechanical actuator which acts on a control valve of the hydrostatic drive system.

According to a further preferred embodiment of the method according to the invention, the temperature or the pressure of the refrigerant are measured at the output of the evaporator and/or the surface temperature is measured in the evaporator network and/or the air outlet temperature is measured upstream of the evaporator, converted into electrical signals if necessary and supplied to the electronic control circuit. From these values, the extent of the evaporator icing is determined. The advantage of this measure lies in the fact that the evaporator can always be maximally utilized.

To prevent damage to the compressor, the danger of the so-called hydraulic shock, in particular, must be effectively countered by measuring both the pressure and the temperature on the intake side of the compressor and supplying electric signals corresponding to these values to the control circuit.

In addition, it is advantageous if the rotational speed of the driving engine of the vehicle is sensed by means of a sensor device and supplied to the electronic control circuit and the control circuit detects when a predetermined rotational speed is exceeded. This prevents damaging speeds for the compressor. In addition, the control circuit calculates the value of the acceleration from in each case two values of the engine speed which follow each other in time. Performing the first derivation of the engine speed, early recognition of the speed variation and timely intervention in the control loop is possible.

The position and/or movement of the accelerator pedal is suitably sensed by means of a sensor and a corresponding signal is supplied to the control circuit. This makes it possible temporarily to switch off the compressor and, if necessary, also the blower and ventilating fan drives in phases of high acceleration of the driving engine so that the greatest possible power is available at the driving wheels of the vehicle, for example for processes of overtaking.

A motor vehicle air conditioning system of the generic type comprises a refrigeration circuit having at least one capacity-controlled refrigerant compressor, a condenser, an evaporator and a throttle device for the refrigerant, arranged upstream of the evaporator, the condenser being associated with a ventilating fan for cooling air charging purposes and a blower being provided for generating an airstream through the evaporator.

The object of creating a motor vehicle air conditioning system for carrying out the method is achieved, in accordance with the invention, by the fact that sensor means are provided for sensing the compressor capacity, the condenser capacity and the evaporator capacity and the sensor means are connected, with interposition of measuring transformers, if necessary, to a common electronic control circuit, the electronic control circuit comprising at least one microprocessor, and the output of the electronic control circuit is connected to electrically controllable actuators for influencing the compressor capacity, the condenser capacity and/or the evaporator capacity.

BRIEF DESCRIPTION OF THE DRAWINGS

With the above as background, reference should now be made to the following figures for a detailed description of the invention, in which.

DETAILED DESCRIPTION OF THE PREFERRED EMBODIMENTS

Figure 1:
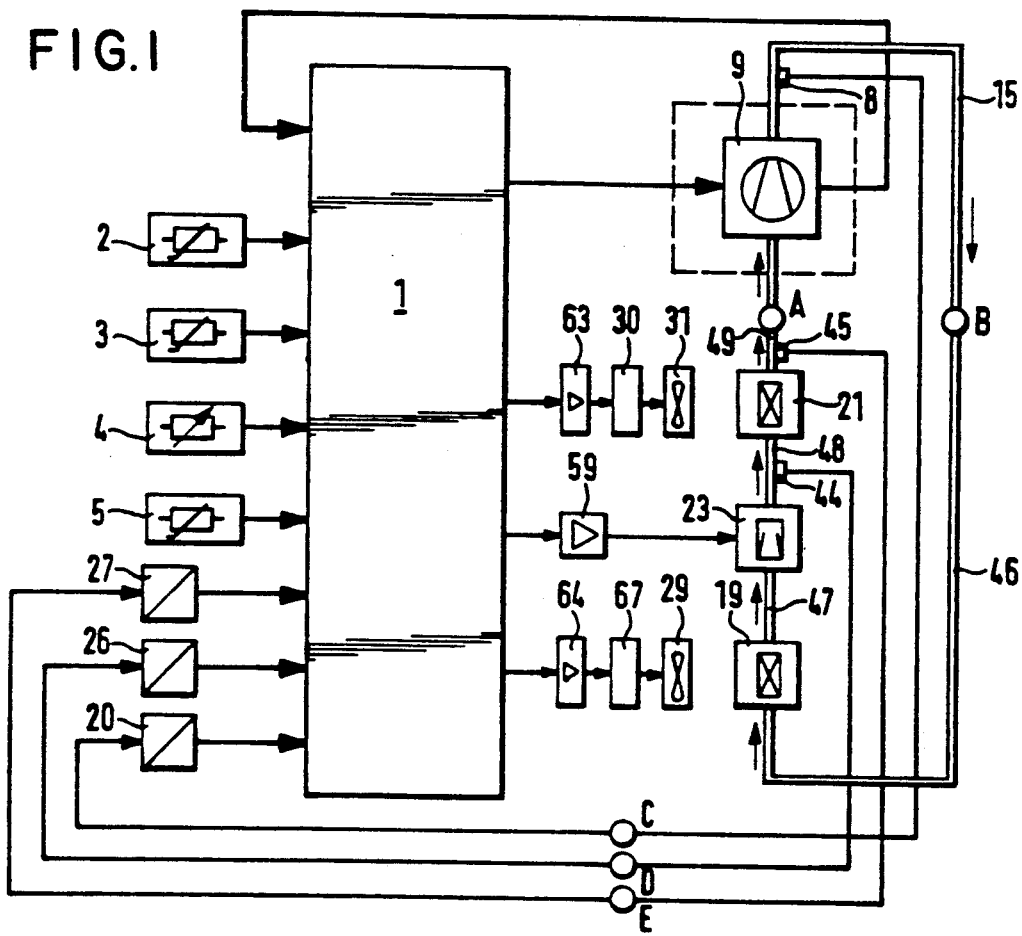
FIG. 1 shows a device for controlling and monitoring the refrigerant circuit of a motor vehicle air conditioning system, including an electronic control circuit 1 comprising at least one microprocessor.

In FIG. 1, an internal space temperature sensor 2, an outside temperature sensor 3, a set point adjustor 4 and a solar irradiation sensor 5 are connected to the input connections of an electronic control circuit 1. The output of the electronic control circuit 1 is connected to a continuously controllable compressor 9.

At the output of the compressor 9, a sensor 8 for sensing the hot gas temperature is arranged at a refrigerant line 15. This sensor 8 is connected via a connection C to a measuring converter 20 which, in turn, is connected to an input of the electronic control circuit 1. From the pressure side of the compressor 9, the refrigerant line 15 goes to a connection point B. From the connection point B, a refrigerant line 46 leads to a condenser 19.

From the condenser 19, a refrigerant line 47 leads to an injection valve 23. The injection valve 23 is connected via a power driver 59 to one output of the electronic control circuit 1 and receives the control signals from the latter. From the injection valve 23, a refrigerant line 48 leads to an evaporator 21 from the output of which a refrigerant line 49 leads to a connection point A and from there to the intake side of the compressor 9.

A condensor saturation temperature sensor 68 is connected via a connection point H to a signal converter 69, which in turn is coupled to one input of the electronic control circuit. A further sensor 44 is arranged at the refrigerant line 48 which senses the injection temperature or the pressure of the refrigerant at the input of the evaporator 21 and is connected via a connection point D to a signal converter 26 which, in turn, is connected to one input of the electronic control circuit 1. At the refrigerant line 49, a third sensor 45 is arranged which senses the suction pressure or the suction temperature and from which a sensor line leads via a connection point E to a signal converter 27 which, in turn, is connected to one input of the control circuit 1.

The evaporator 21 is associated with an evaporator blower 31 which is driven by means of a controllable drive element 30. This switchable drive element 30, for example an electric motor with interposition of a power amplifier 63, is connected to the output side of the control circuit 1 and receives from it the control pulses as determined by the required capacity of the evaporator blower 31.

The condenser 19 is associated with a ventilating fan 29 which is driven via a controllable drive element 67. For the purpose of driving the drive element 67, the latter is connected, with interposition of a power amplifier 64, to the output side of the control circuit 1. The power amplifier 63 and 64 can be constructed, for example, as current or voltage regulators.

In the control and monitoring device of a refrigeration circuit, shown in FIG. 1, all sensor signals of the different sensors 2, 3, 4, 5, 8, 44, 45 are supplied, with interposition of the signal converters 20, 26, 27, if necessary to the control circuit 1 and are logically combined with one another within this circuit. Output signals are calculated in the electronic control circuit 1 in dependence on or taking into consideration all input variables in order to obtain from this an optimum operating mode of the components located in the refrigeration circuit. The control circuit 1 influences the drive power of the compressor 9 and a corresponding signal of the instantaneous compressor capacity is returned to the input side of the control circuit 1.

In addition, the control circuit 1 influences the air throughput through the evaporator 21 with the aid of the evaporator blower 31, the control circuit 1 driving the drive element 30 via the power amplifier 63 as determined by the required air throughput. Similarly, the air throughput through the condenser 19 is determined by the control circuit 1. Corresponding output signals of the control circuit 1 are supplied via the power amplifier 64 to the drive element 67 which drives the ventilating fan 29 as determined by these control signals.

The injection valve 23, too, which is preferably constructed as an electromagnetically actuatable valve, receives its drive pulses from the control circuit 1 via the power driver 59, the volume of refrigerant injected into the evaporator 21 also being the result of the corresponding output signal of the control circuit 1 being calculated in dependence on the input variables.

Figure 2:
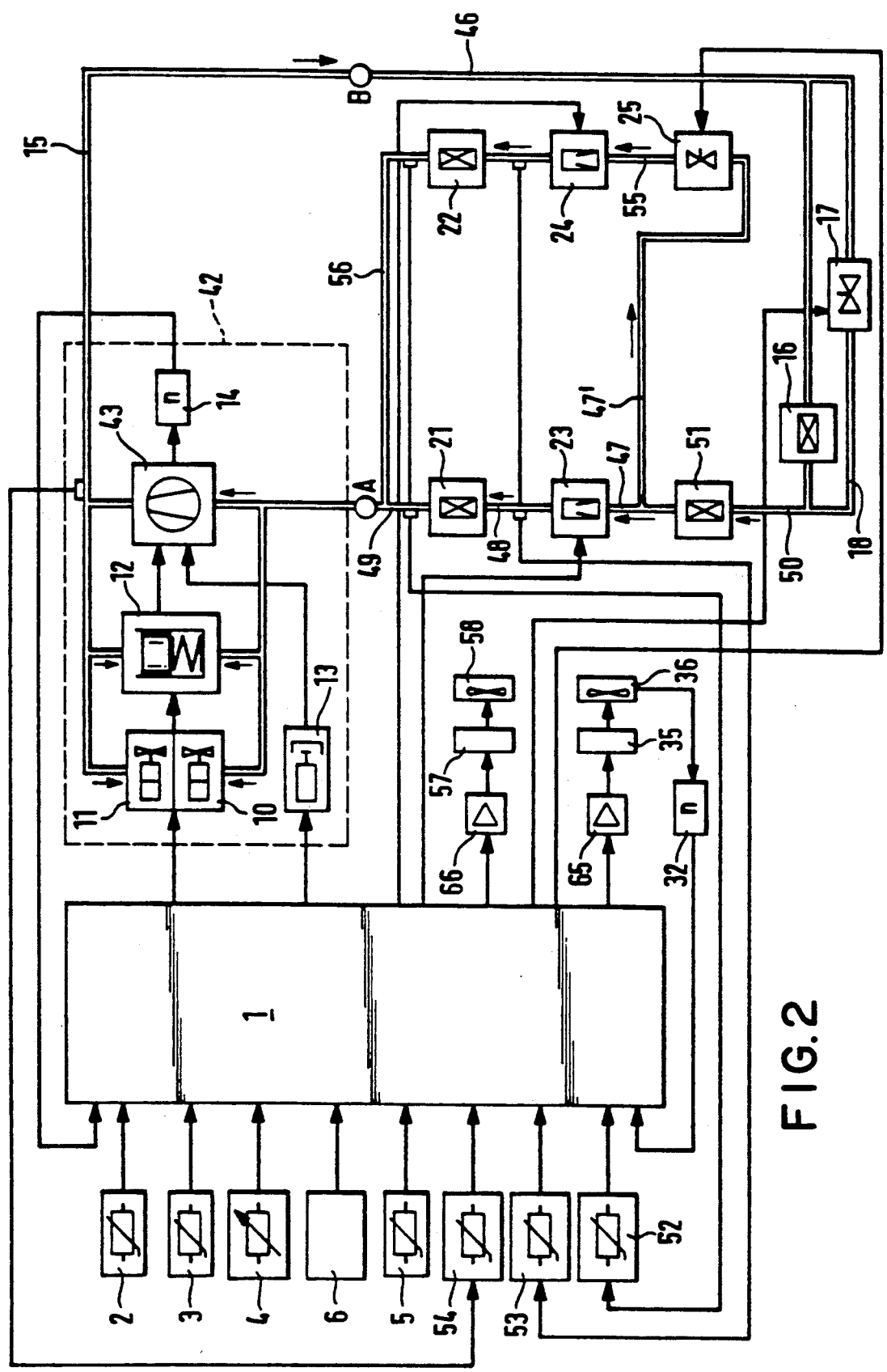
FIG. 2 shows a variant of the embodiment of FIG. 1.

FIG. 2 shows a variant of the embodiment of FIG. 1 in which the refrigerant circuit is designed to be more extensive. The input of the electronic control circuit 1 is connected to a temperature sensor 2, an outside temperature sensor 3, a set point adjustor 4 and a solar irradiation sensor 5. In addition, a moisture sensor 6 is connected to the input terminals of the control circuit 1. A continuously controllable compressor unit 42 is also shown which comprises a compressor 43, a suction pressure valve 10 and a high pressure valve 11, a control piston 12 and a switchable compressor clutch 13. The compressor clutch 13, which is connected to a drive system, not shown in the drawing, is connected via a control line to an output of the control circuit 1. On its output side, the compressor clutch 13 acts on the compressor 43.

The suction pressure valve 10 and the high pressure valve 11 are also connected to the output side of the electronic control circuit 1 and are driven by it. Between the suction connection and the high pressure connection of the compressor 43, the control piston 12 is located by means of which the geometric delivery volume of the compressor 43 can be adjusted. The suction pressure valve 10 and the high pressure valve 11 act on the control piston 12 which, in turn, acts on the compressor 43. The compressor 43 is connected to a speed sensor 14 the output signals of which are conducted to the input side of the control circuit 1.

The hot gas temperature of the refrigerant is sensed at a refrigerant line 15 by a hot gas temperature sensor 54 which is connected to one input of the control circuit 1. From the compressor unit 42, the refrigerant line 15, the so-called high pressure line, leads to the connection point B. From the connection point B, another refrigerant line 46 leads to a refrigerant condenser 16. The refrigerant condenser 16 is bypassed by a bypass line 18 into which an electrically actuatable shut-off valve 17 is connected. The refrigerant condenser 16 and the bypass line 18 are followed by another refrigerant condenser 51, a refrigerant line 50 being provided between the two refrigerant condensers 16 and 51.

At the output of the second refrigerant condenser 5, the refrigerant line 47 branches, one branch of the refrigerant line 47 leading to an injection valve 23 and the branched section 47' of the refrigerant line leading to a shut-off valve 25. From the injection valve 23, a refrigerant line 48 leads to the first evaporator 21 the output of which is conducted via the refrigerant line 49 to the connection point A on the suction side of the compressor unit 42.

From the shut-off valve 25, a refrigerant line 55 leads to a second injection valve 24 which is followed by a second evaporator 22. If the second injection valve 24 is constructed as electromagnetically actuatable valve and also fulfills the blocking function of the shut-off valve 25, the shut-off valve 25 can be omitted. On the output side, the evaporator is connected via a refrigerant line 56 to the connection point A on the suction side of the compressor unit 42. On the injection side of the two evaporators 21 and 22, the injection temperature of the refrigerant is measured in each case by means of an injection temperature sensor 53 the signal of which is supplied to the input side of the control circuit 1. In addition, the suction tube temperature is measured at the refrigerant lines 49 and 56, that is to say on the suction side of the compressor, by means of a suction tube temperature sensor 52 which is connected to the input side of the control circuit 1.

The shut-off valves 17 and 25 are preferably constructed as electromagnetic valves and connected by means of appropriate control lines to outputs of the electronic control circuit 1. The injection valves 23 and 24, which are also constructed as electromagnetically actuatable valves, are connected to outputs of the control circuit 1 via control lines. The two refrigerant condensers 16 and 19 are associated with a condenser ventilating fan 36 which is driven by a direct-current motor 35. This is preferably a motor driven with a pulse-width modulated pulse sequence, the pulse-width modulated signal being generated by the control circuit 1 and being supplied to the motor 35 via a power amplifier 65. A speed sensor 32 is associated with the ventilating fan 36 and the speed sensor 32 generates a signal corresponding to the respective rotational speed of the ventilating fan 36 which is supplied to the electronic control circuit 1.

An evaporator blower 58 is provided for charging the evaporator 21 and 22 on the air side. The evaporator blower 58 is driven by a controllable electric motor 57, the electric motor 57 being driven in a similar manner to the electric motor 35 by pulse-width modulated signals from the control circuit 1 via a power amplifier 66. This results in a technically simple closed-loop control arrangement with low power loss, which can be both stepped and quasi-continuous. The pulse sequence both for the electric motor 35 and for the electric motor 57 should be within a frequency range of less than 1000 Hz, preferably below 100 Hz. If necessary, a continuous closed loop control system can also be provided.

In the control and monitoring device of a refrigeration circuit shown in FIG. 2, all sensor signals of the different sensors 2, 3, 4, 5, 6, 52, 53 and 54 are supplied to the control circuit 1 and logically combined with one another within the latter. In addition, the signals of the speed sensors 14 and 32 are supplied to the control circuit 1 which are logically combined with the input variables already mentioned. In the electronic control circuit 1, the output signals are calculated in dependence or with consideration of all input variables in order to obtain from this an optimum operating mode of the components located within the refrigeration circuit. Thus, the control circuit 1 acts on the suction pressure valve 10 and the high pressure valve 11 and, in addition, controls the geometric delivery volume of the compressor 43 by means of the control piston 12. However, it is not only the geometric delivery volume of the compressor 43 which is adjusted but also the compressor speed and duration of compressor connection via the compressor clutch 13 which receives its control signals from the control circuit 1.

In this manner, the compressor unit 42 generates a high pressure which is supplied to the refrigerant condensers 16 and 51 through the refrigerant lines 15 and 46. The refrigerant condenser 16 only acts when the shut-off valve 17 is closed, otherwise the refrigerant is conducted completely through the bypass 18 to the refrigerant condenser 51. In this connection, the drive to the shutoff valve 17 essentially depends on what condenser capacity is required for the optimum operation of the refrigerant circuit. If the capacity of the condenser 51 is inadequate, either the condenser ventilating fan 36 can b operated or its speed increased, or the second refrigerant condenser 16 can be connected by closing the shut-off valve 17, in order to increase the capacity.

Depending on refrigeration capacity needed, the first evaporator 21 can be optionally operated alone or both evaporators 21 and 22 can be optionally jointly operated. The shut-off valve 25 is provided for this purpose in front of the injection valve 24, the refrigeration capacity requirement being determined by the control circuit 1 on the basis of the input variables supplied by the sensors. The corresponding refrigerant volume supplied to the evaporators 21 and 22 is metered by the injection valves 23 and 24 which, in turn, are driven by the control circuit 1, taking into consideration all other parameters.

To influence the air-side charging of the evaporator 21 or both evaporators 21 and 22, the rotational speed of the evaporator blower 58 is variable. The blower speed is controlled by a pulsewidth modulated signal, already previously mentioned, being supplied to the electric motor 57.

The suction tube temperature sensor 52, the injection temperature sensor 53, the heating gas temperature sensor 54 and the speed sensor 14 sense the essential measurement values from which the control circuit 1 determines the compressor capacity, the condenser capacity and the evaporator capacity current in each case. From these values and the variables of the other sensors, the respective refrigeration capacity requirement is calculated in the control circuit 1 and it is determined whether there is a risk of evaporator icing or of hydraulic shock or of another critical operating state.

Thus, the action of a single control circuit which is jointly responsible for all drivable actuators enables optimum interaction of all components involved in the refrigeration circuit, with the most efficient utilization of energy possible. It is also essential for optimum process control that it is possible to act simultaneously on several actuators jointly and in co-ordination, in which arrangement the control device detects control errors extremely rapidly from the feedback signals via the sensors and thus is capable of intervening in the control loop at a very early stage as a result of which overshooting of the controlled variables is avoided.

Figure 3:
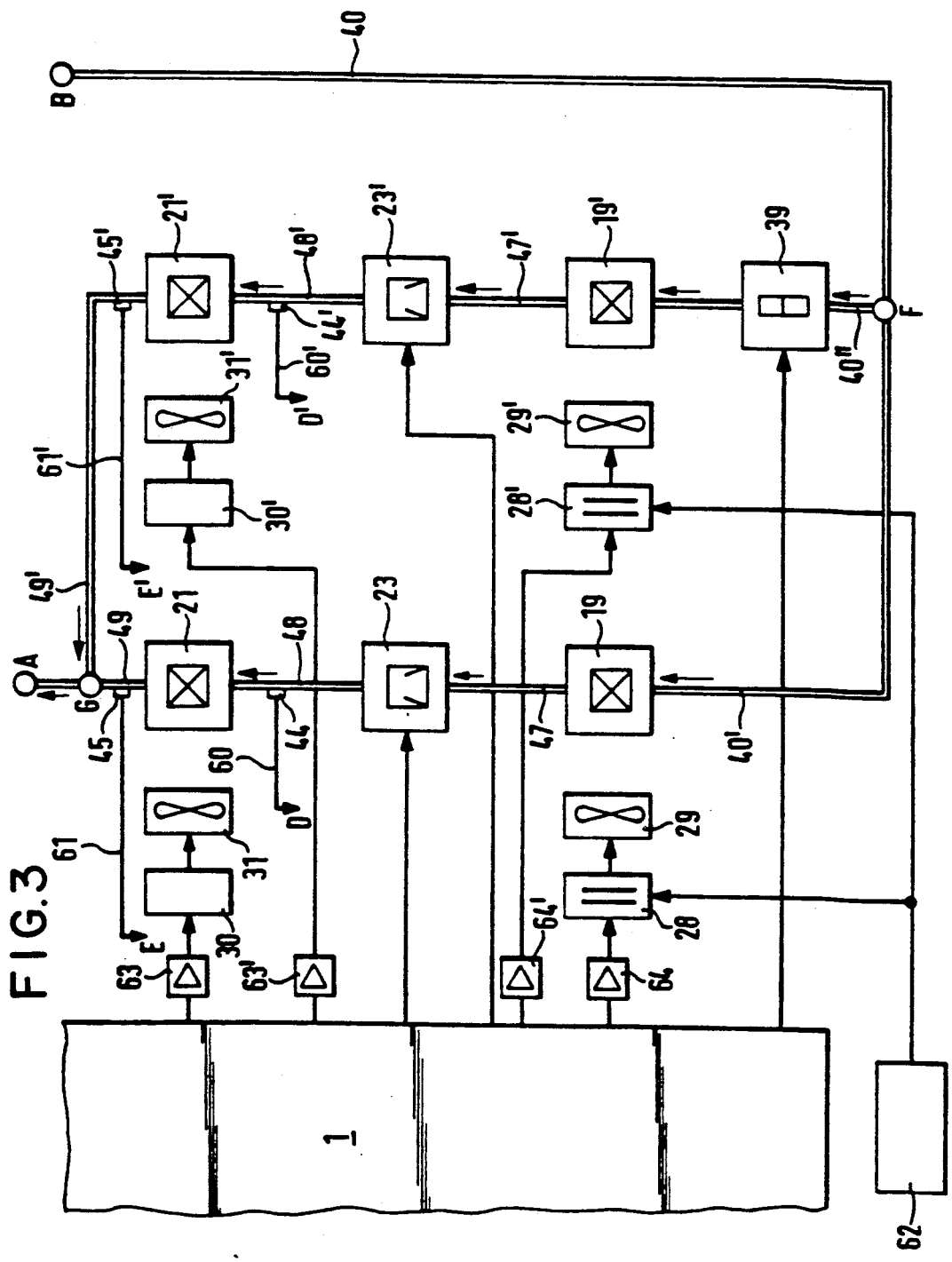
FIG. 3 shows a variant of the embodiment of FIG. 1 with respect to the condenser and evaporator arrangement.

FIG. 3 shows a variant of an embodiment of a condenser and evaporator arrangement. The remaining components of the overall system can be constructed, for example, as in FIG. 1 or FIG. 2. The compressor unit is not shown in FIG. 3 and would be connected between connection points A and B in FIG. 3. As can be seen from FIG. 3, two condenser/evaporator units are connected completely in parallel. From the connection point B, a refrigerant line 40 leads to a branching point F at which the refrigerant line 40 is branched into two sections 40' and 40''. The line branch 40', leads to a first condenser 19.

The condenser 19 is associated with a ventilating fan 29 which is driven by a vehicle engine 62 via a switchable clutch 28, for example a controllable fluid friction clutch. For the purpose of driving the switchable clutch 28, the latter is connected to the output side of the control circuit 1 via a power amplifier 64.

In the refrigerant line branch 40'', a shut-off valve 39 is arranged which is connected to the output side of the control circuit 1 and receives from it control signals, and a second condenser 19' exists which is connected in series with the shut-off valve 39. The shutoff valve 39 can be arranged either in front of the second condenser 19' or between the latter and a following second injection valve 23'. If the second injection valve 24 is constructed as an electromagnetically actuatable valve and also fulfills the blocking function of the shut-off valve 39, the shut-off valve 39 can be omitted.

For the second condenser 19', a second ventilating fan 29' is provided which is driven by the driving engine 60 of the vehicle in the same manner as the ventilating fan 29 by means of a switchable clutch 28'. However, the clutch 28' is driven completely independently of the drive to the clutch 28, a power amplifier 64' being connected into the control line.

From the condenser 19, a refrigerant line 47 leads to a first injection valve 23 which is connected by means of a control line to the control circuit 1 and can be driven by the latter. The condenser 19' is followed by a second injection valve 23' to which a refrigerant line 47' leads, starting from the condenser 19'. A condensor saturation temperature sensor 68' is also associated with condensor 19'. The second injection valve 23' is also connected by means of a control line to the control circuit 1 and is driven by the latter, the driving being effected, however, completely independently of that of the injection valve 23.

From the injection valve 23, a refrigerant line 48 leads to a first evaporator 21. At the refrigerant line 48, a sensor 44 is arranged from which a sensor line 60 leads to a connecting point D as is shown, for example, in FIG. 1, and from there on to the input side of the control circuit 1. From the second injection valve 23', a pressure medium line 48' leads to a second evaporator 21', a sensor 44', from which a sensor line 60' leads to a connection point D', being arranged in front of the inlet into the evaporator 21' at the refrigerant line 28'.

At the output side, a refrigerant line 49 and 49' is connected in each case to the evaporators 21 and 21' and both refrigerant lines join together at the junction point G. From the junction point G, the refrigerant line leads to the connection point A. At the output side of the evaporator 21, a sensor 45 is provided at the refrigerant line and at the output side of the second evaporator 21', a sensor 45' is provided, in which arrangement these sensors can be used for sensing the suction tube pressure or the suction tube temperature. The sensors 45 and 45' are connected via corresponding sensor lines 61 and 61' to connection points E and E', respectively, in accordance with the representation in FIG. 1.

The first evaporator 21 is associated with a first evaporator blower 31 which is driven by means of a switchable drive element 30, for example an electric motor. This drive element 30 is connected by means of a control line and with interposition of an amplifier 63 to the control circuit and is driven by it. In the same manner, the second evaporator 21' is associated with a second evaporator blower 31' which is driven by means of a controllable drive element 30' in the manner previously described and is actuated via a power amplifier 63' from the control circuit 1. The two evaporator blowers 31 and 31' are also operated independently of one another in accordance with the respective control commands issued by the control circuit 1 via the amplifiers 63 and 63' to the drive elements 30 and 31.

The variant of the embodiment of the condenser and evaporator arrangement shown in FIG. 3 can be combined, for example, with parts of FIG. 1 or FIG. 2, that is to say the arrangement according to FIG. 3 can replace the part of the refrigeration circuit from connection point B to connection point A in FIG. 1 or FIG. 2. The operation of such a combined arrangement essentially corresponds to the descriptions relating to FIG. 1 and FIG. 2.

In the arrangements according to FIG. 1 to FIG. 3, electromagnetic clutches or also hydraulic motors must be alternatively considered as drive elements for the condenser blowers 29, 29' and 36. In the first mentioned case, relays would be used and in the last mentioned case electrically actuated hydraulic valves would be used as power amplifiers 63, 63' and 65.

Figure 4:
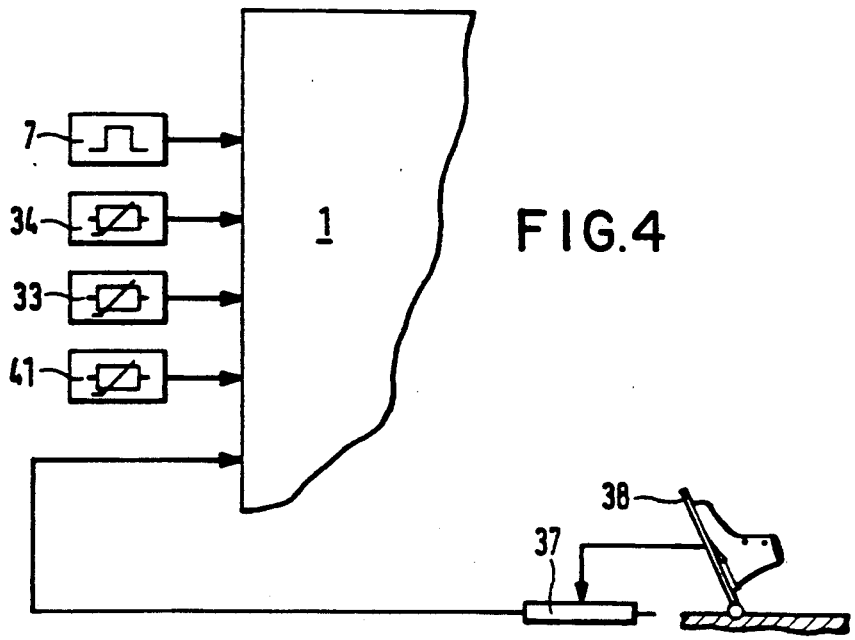
FIG. 4 shows an embodiment having additional sensors.

FIG. 4 shows an embodiment of the electronic control circuit 1 having additional sensors for particular operating states of the driving engine and of its cooling and lubricant cooling. In this embodiment, an engine speed sensor 7, a temperature sensor 33 for the cooling water of the driving engine, a temperature sensor 34 for the engine oil and a temperature sensor 41 for the transmission oil are additionally connected to the input of the electronic control circuit 1. The input variables present at the inputs of the control circuit 1 due to the sensor signals are taken into consideration in conjunction with the remaining input variables, previously described with reference to FIG. 1 and FIG. 2, for calculating the drive signals of the actuating means driven by the control circuit 1.

In addition, a sensor 37 which senses the position of an accelerator pedal 38 or also the movement of the accelerator pedal 38 by means of calculation being effected in the control circuit is provided in FIG. 4. The respective position of the accelerator pedal 38 can be directly sensed by the instantaneous sensor signal of the sensor 37 and the movement of the accelerator pedal 38 is determined by the fact that two samplings of the sensor signals 37 which are successive in time are compared with each other and from this the difference between the two input variables is formed. Thus, the difference forms a measure of the change of state at the sensor or of the movement of the accelerator pedal 38, respectively. It is possible in this manner to temporarily switch off the compressor and, if necessary, also the blower and ventilating fan drives in phases of high acceleration of the driving engine so that the highest possible power is available at the driving wheels of the vehicle when needed, for example, when passing another vehicle.

In addition, it can be determined, on the basis of combining the sensor signals of the speed sensor 7 and of the sensor 37 at the accelerator pedal 38 whether the vehicle is in the so-called overrun mode. In overrun mode, an additional braking effect of the engine can be achieved by connecting the compressor since the compressor absorbs some kW of driving power of the engine as a result of which the friction brake of the vehicle is relieved. For the rest, the energy which would otherwise be converted into heat at a point where it cannot be utilized is still suitably utilized in this case.

Figure 5:
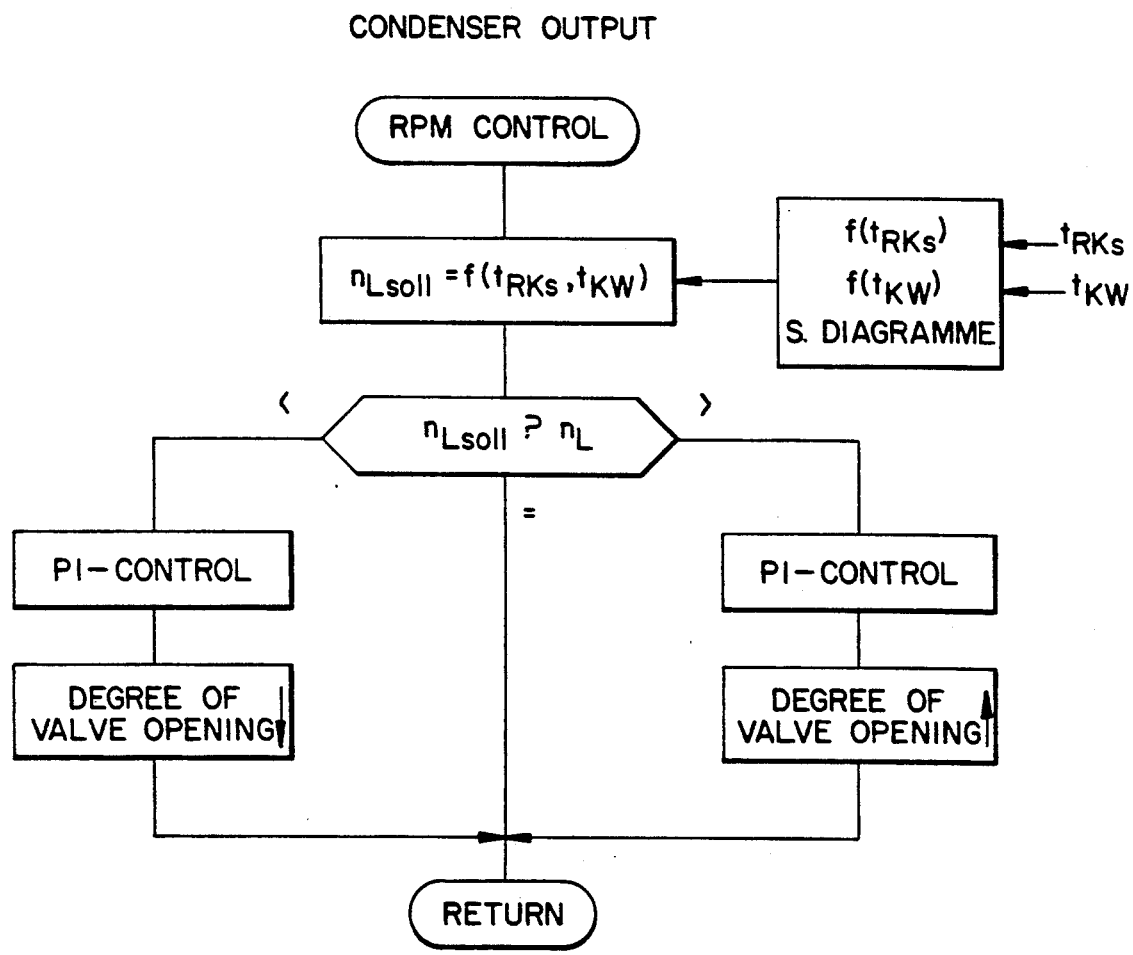
FIGS. 5-7 respectively show flow diagrams illustrating the factors employed by the electronic control circuit condensor output, compressor output and evaporator output.
Figure 6:
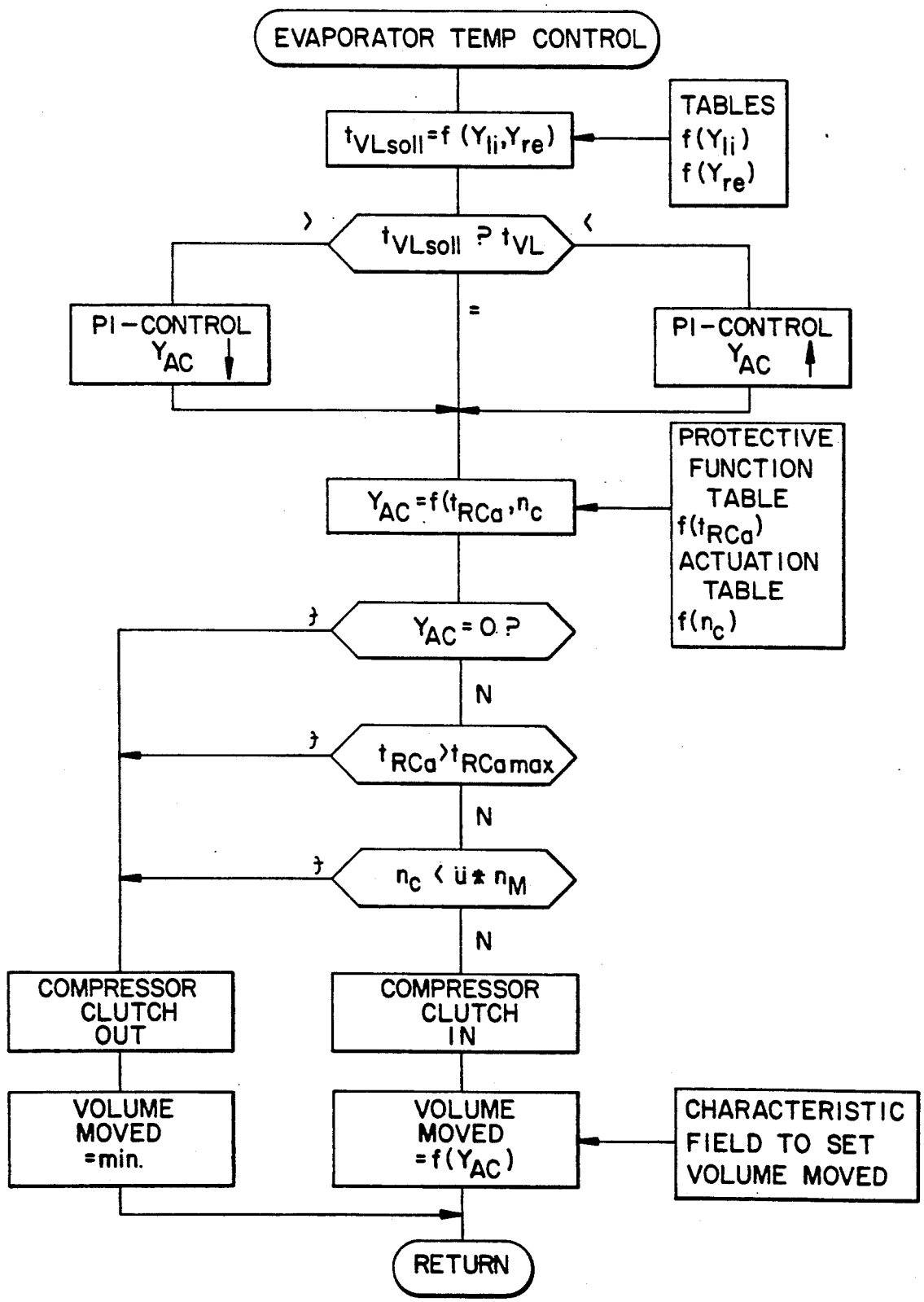
Figure 7:
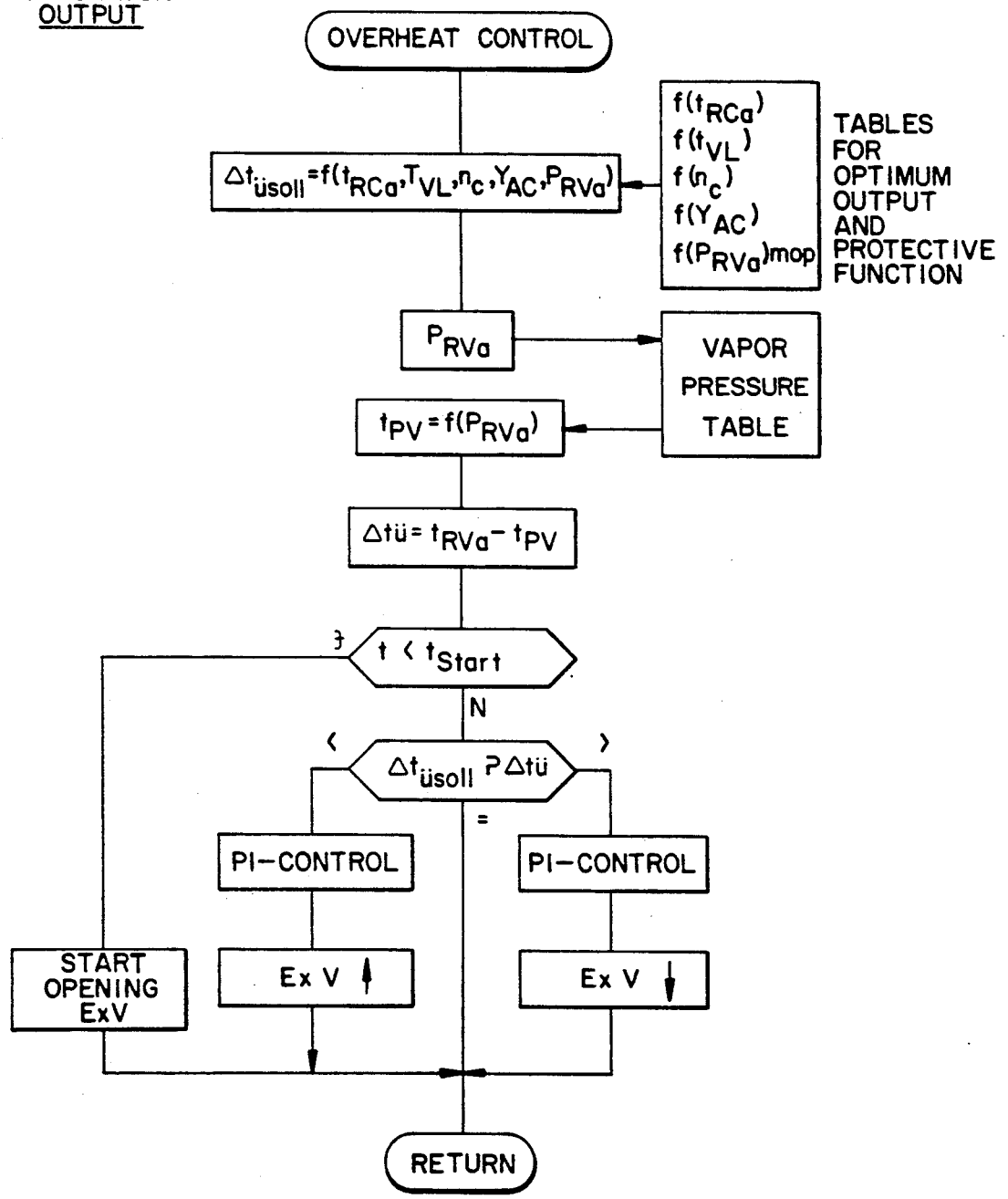
Figure 8:
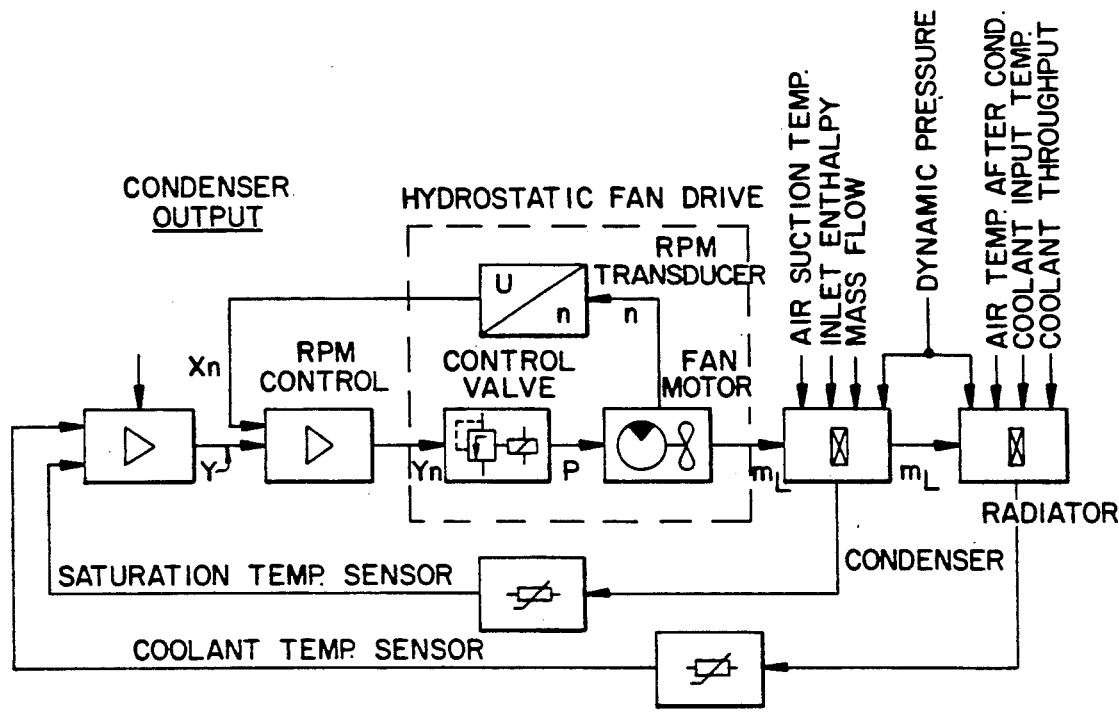
FIGS. 8-10 respectively illustrate control loops for the condensor output, the compressor output and the evaporator output, and FIGS. 11-13 respectively illustrate graphs of the control factors employed in the control loops illustrated in FIGS. 8-10.
Figure 9:
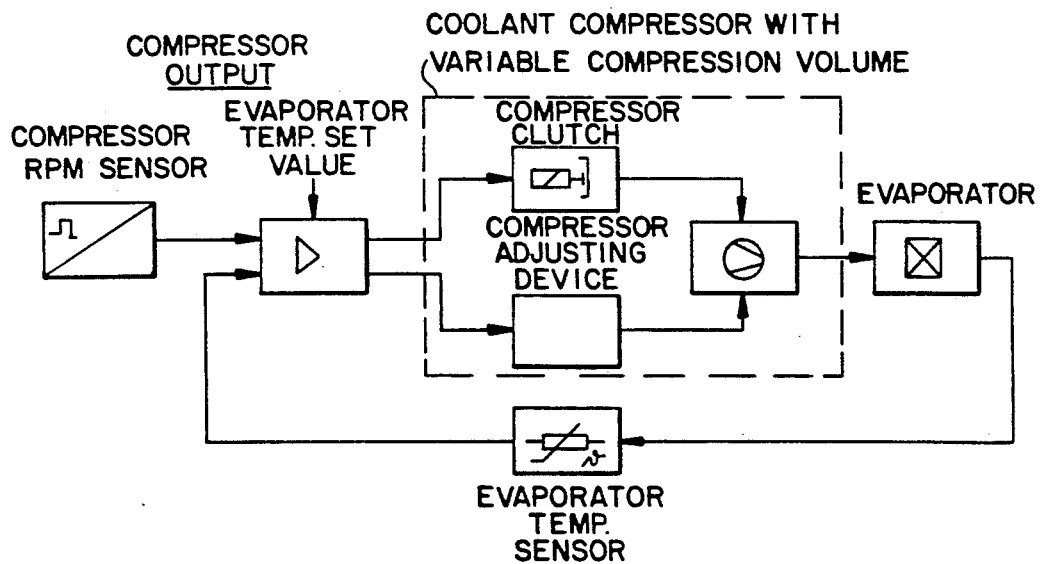
Figure 10:
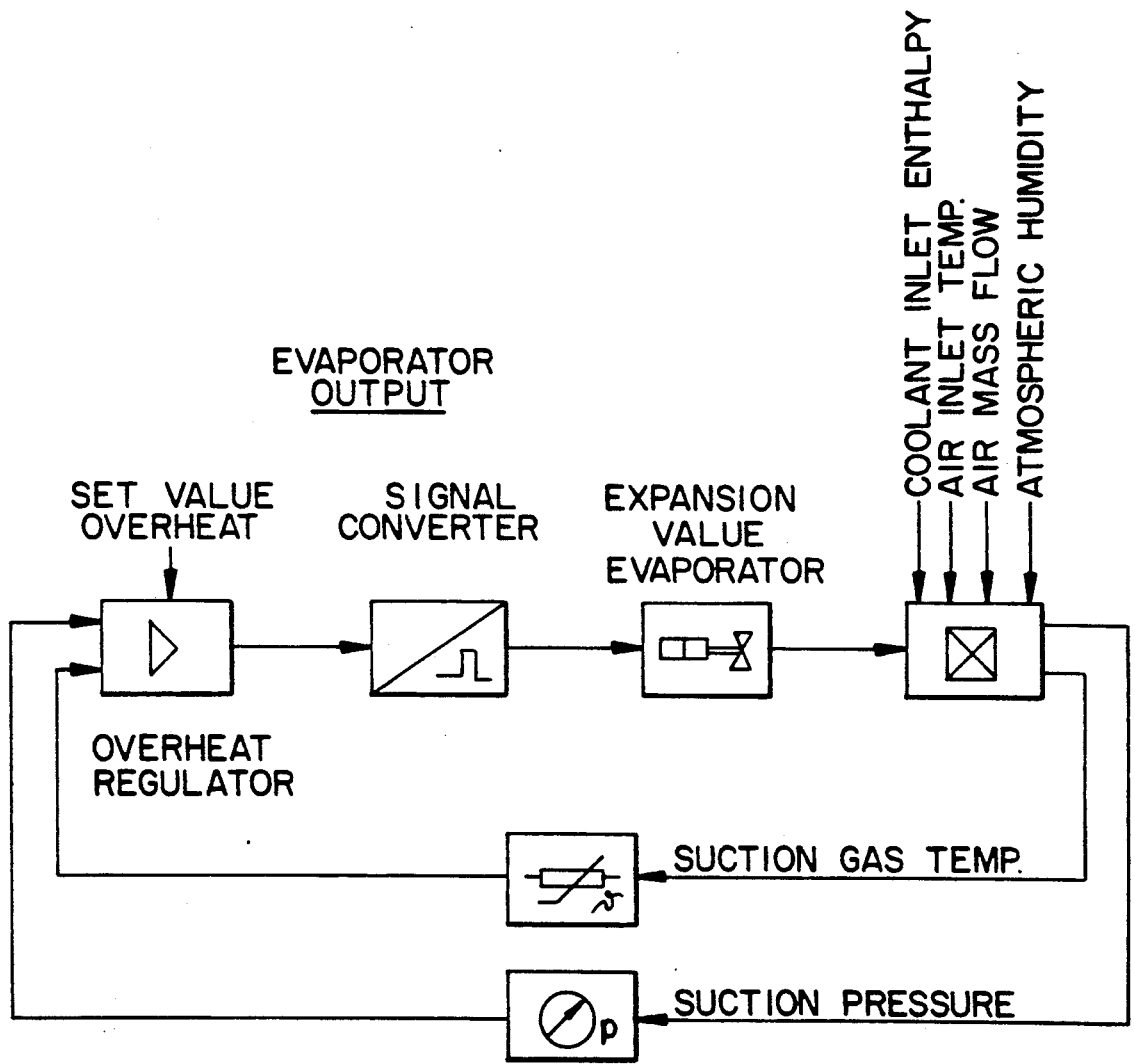
Figure 11:
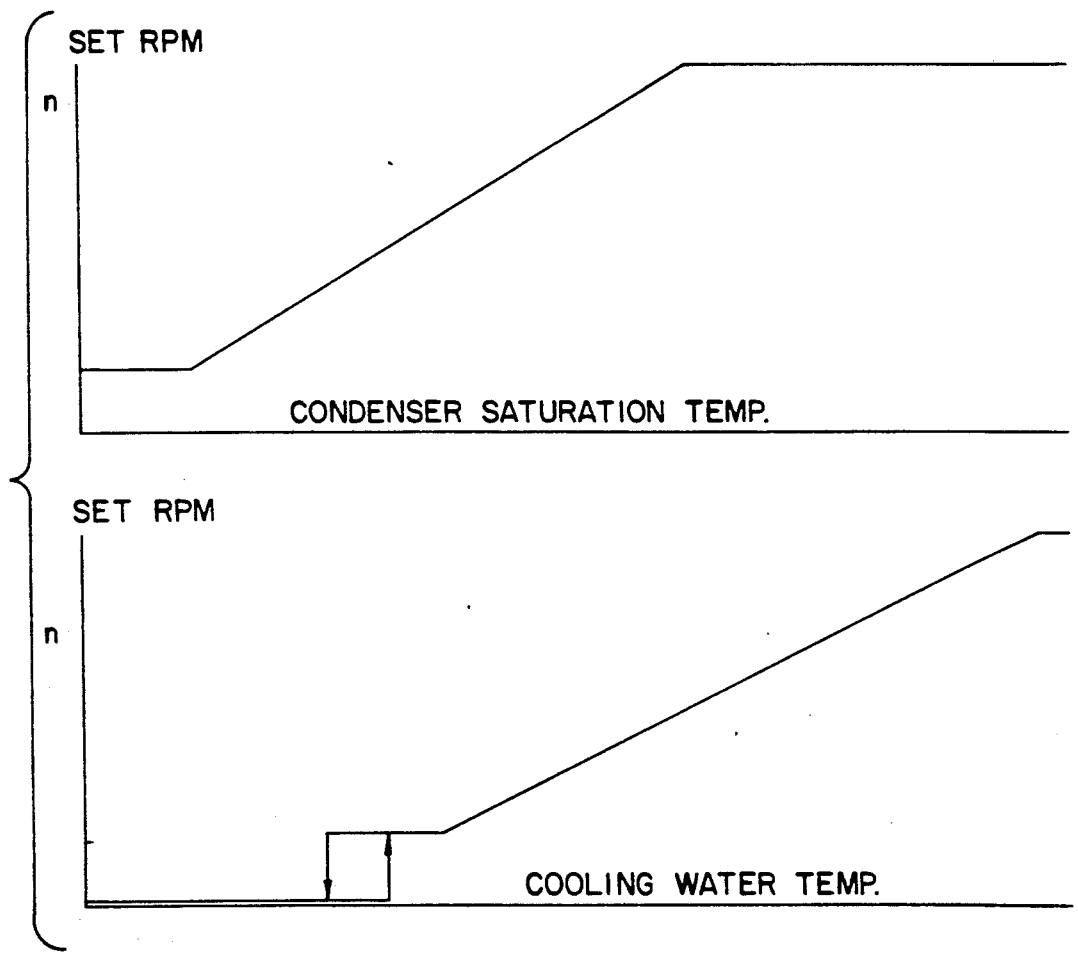
Figure 12:
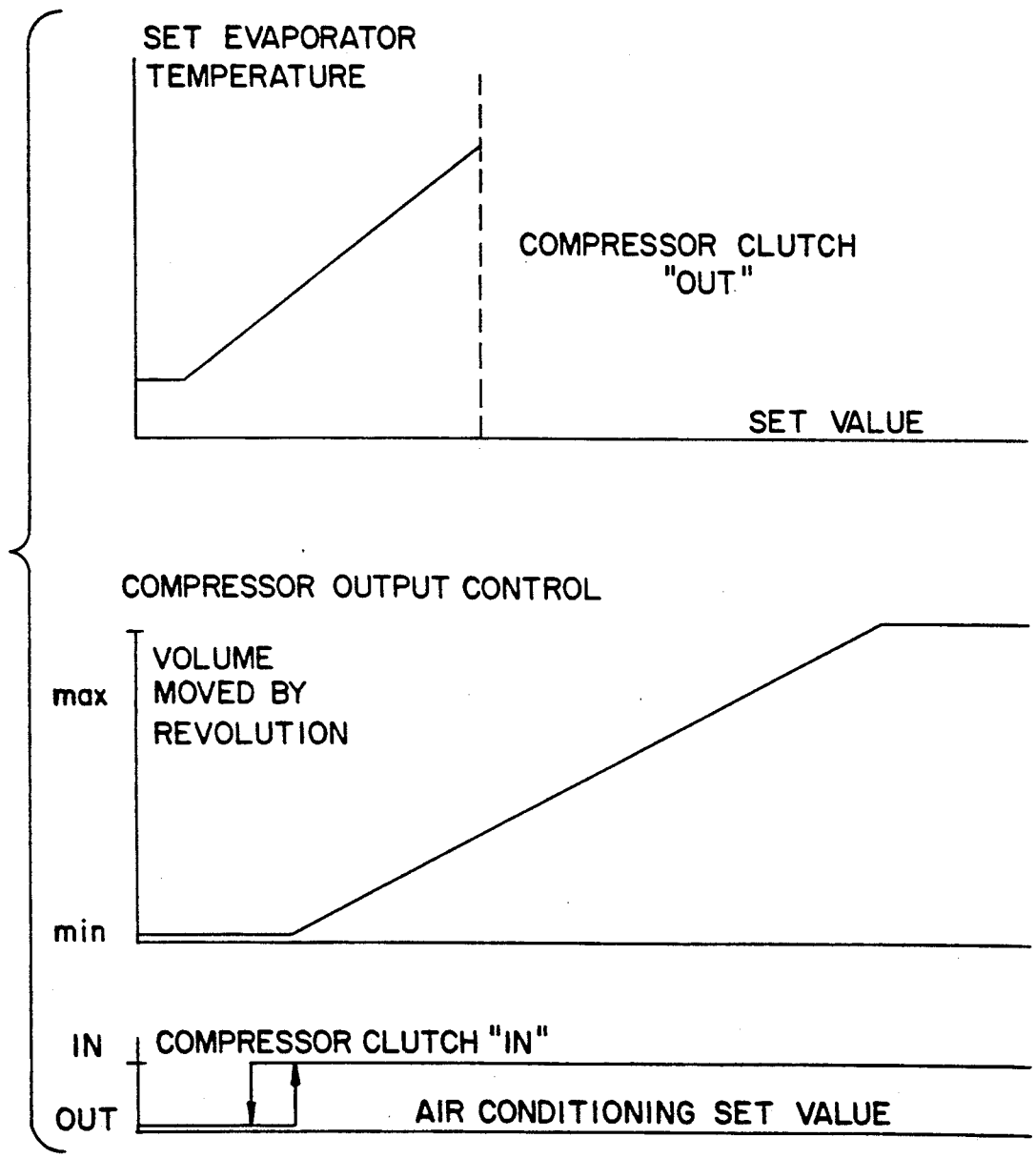
Figure 13:
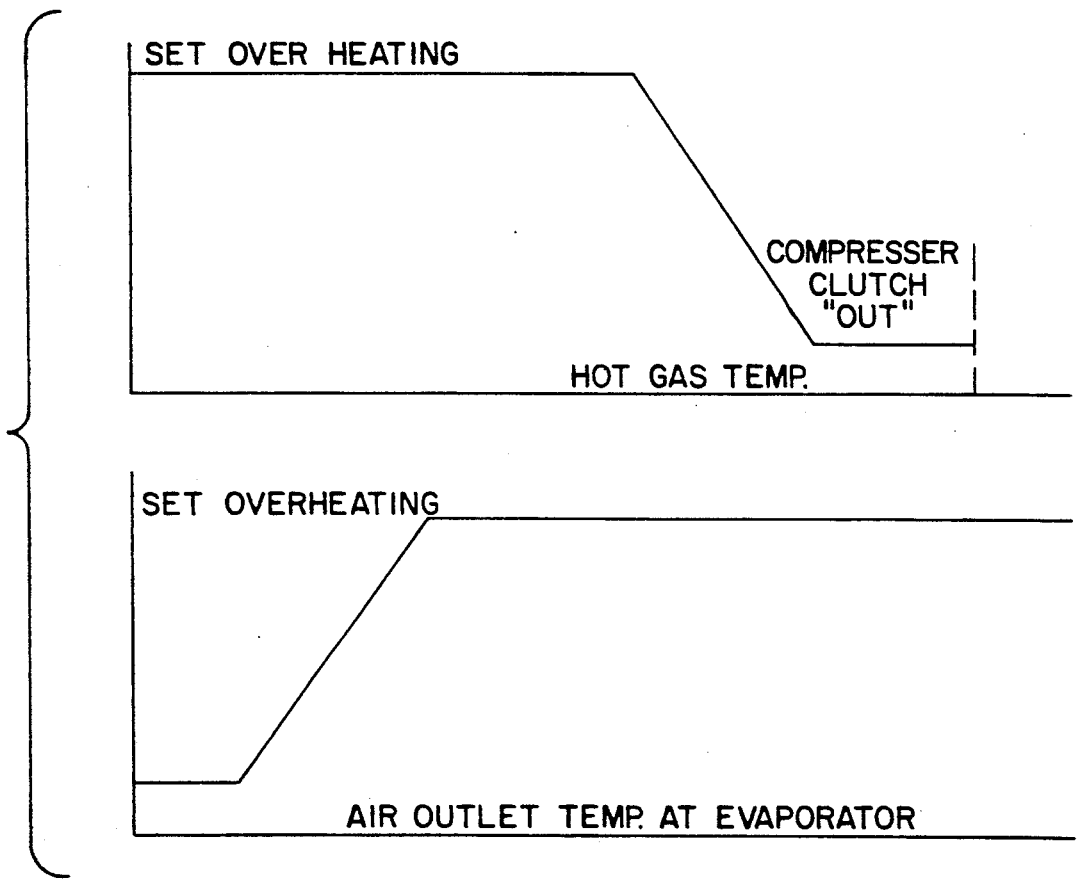

Flow diagrams are provided in FIGS. 5-7 which respectively illustrate the factors employed by the electronic control circuit 1 to control the condensor output, the compressor output and the evaporator output. Tables 1-3 respectively list a description of the variables employed in the flowcharts illustrated in FIGS. 5-7. FIGS. 8-10 respectively illustrate control loops for the condensor output, the compressor output and the evaporator output. FIGS. 11-13 respectively illustrate graphs related to the control factors employed in the control loops of FIGS. 8-10.

The flow diagram shown in FIG. 5 for the condenser output begins with the intersection rpm-control. In a first step, the set value of the fan rpm $n_{Lsoll}$ is determined as a function of the saturation temperature and the coolant temperature ($t_{RKS}$ and $t_{KW}$ are supplied to the first computing stage). The next step carries out the comparison of the set value of the fan $n_{Lsoll}$ with the measured value (actual value) of the fan rpm $n_L$. If this set value $n_{nSoll}$ is smaller than the actual value $n_L$, the PI control in the left branch is activated. In a further step the degree of opening of the valve is reduced and feedback is passed to the intersection RETURN. If the set value $n_{Lsoll}$ is equal to the actual value $n_L$, the result of this comparison is passed over the median branch of the flow diagram directly to the intersection RETURN. If the set value $n_{Nsoll}$ is larger than the actual value $n_L$, a correction valuer is determined through the right hand branch of the flow diagram by the PI controller, which then increases the opening of the value on the subsequent control element. The feedback of this valve adjustment arrives at the intersection RETURN.

The flow diagram shown in FIG. 6 for the compressor output begins at the intersection EVAPORATOR TEMPERATURE CONTROL. In a first step the set value of the evaporator temperature $t_{VLsoll}$ is calculated as a function of the set value Y for the internal temperature left $Y_{li}$ and right $Y_{re}$. The functions of the set values $f(Y_{li})$ and $f(Y_{re})$ are recorded in the tables and passed to the first computing stage. This is followed by a comparison stage, in which the set value of the evaporator temperature $t_{VLsoll}$ is compared with the actual value of the evaporator temperature $t_{VL}$. If the set value $t_{VLsoll}$ is larger than the actual value $t_{VL}$, the PI controller in the left branch is activated and the set value for the compressor control $Y_{AC}$, reduced. If, however, the set value $t_{VLsoll}$ is smaller than the actual value $t_{VL}$, the PI controller in the right branch of the flow diagram is activated and the set value for the compressor control $Y_{AC}$ increased. Both the left branch and the right branch lead to a connecting point to which a median branch is also leading. which is used if the set value $t_{VLsoll}$ is equal to the actual value $t_{VL}$. The next step is the calculation of the set value for the compressor control $Y_{AC}$ as a function of the hot gas temperature and the rpm of the compressor $f(t_{RCa}, c_c)$. for this computation the corresponding conditions are supplied from the protective function table. The next is the comparison of the set value for the compressor control $Y_{AC}$ with the value 0. If $Y_{AC}=0$, the left branch of the flow diagram is used, in which the next step is the deactivation of the compressor clutch. If the set value for the compressor control $Y_{AC}$ has a value other than 0, it is determined in a comparison stage, whether the hot gas temperature $t_{RCa}$ is higher than the maximum permissible hot gas temperature $t_{RCa}$max. If the result of this comparison is positive, the compressor clutch is again disconnected. If, however, the result is negative, a third comparison stage follows, in which it is determined whether the rpm of the compressor $n_c$ is smaller than the gear ratio of the compressor rpm to the engine rpm $n_c/n_M$. If the result is positive, the left branch of the flow diagram is again used and the compressor clutch disconnected. The next step in the left branch of the flow diagram then is the adjustment of the displaced volume of the compressor to its lowest value. This last step is followed by the intersection RETURN. If all of the aforementioned three comparisons for $Y_{AC}$, $t_{RCa}$ and $n_c$ are negative, the compressor clutch is activated. The next step is the adjustment of the displaced volume of the compressor as a function of the set value for the compressor control $f(Y_{AC})$. The data of the characteristic diagram are supplied for this computation of the volume required. The flow diagram then terminates at the RETURN intersection.

The flow diagram in FIG. 7 for the evaporator output begins at the intersection of OVERHEAT-CONTROL and in a first computing stage the set value of the overheat $\Delta t_{usoll}$ is determined as a function of the hot gas temperature, evaporator temperature, compressor rpm, set value of the compressor clutch and the suction pressure $f(t_{RCa}, t_{VL}, n_c, U_{AC}, P_{RVa})$. for this computation the tables for optimum output and the protective functions of the computation stage are supplied. The next stage in the flow diagram is the determination of the suction pressure, the value of which is supplied to the steam pressure table. From the steam pressure table a corresponding value of the computation stage for the saturation temperature in the evaporator $t_{PV}$ is calculated as a function of the suction pressure $f(P_{RVa})$. The next step is the calculation of the overheat value $\Delta t_{ü}$ forming the difference of the suction pipe temperature $t_{RVa}$ and the saturation temperature in the evaporator $t_{PV}$. It is then determined whether the time following the actuation of the AC device t is shorter than the duration of the start opening $t_{start}$. If this determination is positive, as the next step the start opening of the expansion valve follows, from where the branch of the flow diagram proceeds to a connecting point directly in front of the intersection RETURN. If the decision $t <$ as $t_{start}$ is negative, a second decision stage follows, in which the set value of the overheat $\Delta t_{üsoll}$ is compared with the overheat $\Delta t_{ü}$. If $\Delta t_{üsoll} < \Delta t_{ü}$, a PI controller is followed by the actuation of the expansion valve (E×V) and from there the process proceeds to the connecting point in front of the RETURN intersection. If $\Delta t_{üsoll} = \Delta t_{ü}$, the decision stage is followed directly by the RETURN intersection. If $\Delta t_{üsoll} > \Delta t_{ü}$, the right branch of the flow diagram is used, in which initially the PI controller and then the adjusting mechanism of the expansion valve are provided, before said branch arrives at the connecting point in front of the RETURN intersection.

The control circuit in FIG. 8 is provided to regulate the condenser output. In a first control the measured value of the saturation temperature sensor and the measured value of the coolant temperature sensor are introduced as the input signal. The set value is also entered in this control. The initial value Y is fed to a rpm regulator; it contains as a further input signal the Xn value, which represents a signal depending on the rpm of the fan motor. The rpm regulator has an output value Yn which acts on the control valve, which determines the pressure P for the hydraulic drive of the fan motor. The air flow $m_L$ produced by the fan passes through the condenser and subsequently to the radiator. Several parameters act on the condenser, i.e. the air intake temperature, the inlet enthalpy of the coolant, the coolant mass flow and the compression pressure. The saturation temperature of the coolant is detected by the saturation temperature sensor and passed, as mentioned above, to the first regulator. The radiator is also affected by several parameters, i.e. the compression pressure, the air temperature following the condenser, the coolant flow temperature and the coolant flow rate. The coolant temperature is detected by the corresponding sensor and communicated as the inlet value to the first regulator.

The control circuit in FIG. 9 is provided to regulate the compressor output. For the purpose, the signal of the compressor rpm sensor and the signal of an evaporator temperature sensor are supplied to a regulator. In addition, the set value of the evaporator temperature is fed into said regulator. In the regulator then the initial values used to control the compressor, i.e. both the compressor clutch and the adjusting device. The drive through the compressor clutch an adjustment by means of the adjusting device determine the volume of the coolant supplied to the evaporator. At the evaporator the temperature is detected by a suitable sensor, which, as mentioned above, releases a corresponding signal to the inlet of the amplifier.

The control circuit in FIG. 10 is provided for the regulation of the evaporator output. The circuit contains an amplifier, the input signals whereof consist of the set values of the overheat, the suction gas temperature and the suction pressure. An output value of the amplifier computed from these input values is applied to the inlet of a signal transducer, the output signal of which again acts on an adjusting means of the expansion valve. As known in the art, the expansion valve affects by its degree of opening the coolant volume in the evaporator. Several parameters act on the evaporator, i.e. the coolant inlet enthalpy, the air inlet temperature, the air flow rate and the atmospheric humidity. As the evaporator, by means of a temperature sensor the suction gas temperature and by means of a pressure sensor the suction pressure are determined, with the corresponding values serving as the input values of the amplifier.

Measured values supplied by the coolant temperature sensor 34, the saturation temperature sensor 68 and the rpm sensor 32 of the condenser fan are used for the regulation of the condensor output. The temperature sensors 34 and 68 may take the form of temperature dependent resistors or thermoelements. An inductive sensor, a Hall generator, an optoelectronic sensor or some similar device may be employed as the rpm sensor 32. The abovementioned input values are evaluated by the electronic control circuit 1 as illustrated in FIG. 5, and an output signal is calculated and supplied to a control means for the condensor fan. As previously mentioned, the control means can include a variable hydrostatic fan drive (see FIG. 8), a variable fluid friction clutch or a variable electric motor and adjustable shutters.

The values measured by the hot gas temperature sensor 8, the rpm sensor 14 on the compressor, and the evaporator temperature sensor 45 are used for the compressor output control. The electronic control circuit uses these values to generate output signals which are used to actuate the compressor unit. The compressor output may be effected by varying the stroke volume or the rpm control.

The evaporator output is detected by the suction gas temperature sensor 45 and/or a suction pressure sensor. Different sensors are suitable for the determination of suction pressure; they may consist for example of piezoelectric semiconductor sensor, pressure transducers with potentiometers or strain gage bridge circuits. The output value calculated by the electronic control circuit 1 based on these input values is used to control the injection valve 23.

The invention has been described with reference to certain preferred embodiments thereof. The invention, however, is not limited to the specifically disclosed embodiments. Variations and modification may be effected within the scope of the appended claims.

What is claimed is:

1. A method for controlling a motor vehicle air conditioning system containing a refrigeration circuit that includes at least one capacity-controlled refrigerant compressor, a refrigerant condenser, an evaporator, a throttle device for the refrigerant arranged upstream of the evaporator, a ventilating fan for cooling air charging being associated with the condenser, and a blower provided for generating an airstream through the evaporator, said method comprising the steps of:

sensing the compressor capacity, the condenser capacity and the evaporator capacity;

supplying the sensed compressor capacity, condenser capacity and evaporator capacity in the form of electrical variables to input terminals of a common electronic control circuit;

performing logical operations within the common electronic control circuit on at least two of the electrical variables supplied to the common electronic control circuit and on parameters indicative of a refrigerant capacity requirement; and generating control output signals within the common electronic control circuit based upon the logical operations performed therein and supplying the control output signals to compressor, condenser and evaporator device devices that control the compressor capacity, the condenser capacity and the evaporator capacity, respectively.

2. he method as claimed in claim 1, wherein, in order to control the compressor capacity, the compressor control device changes a geometric delivery volume of the compressor by stroke.

3. The method as claimed in claim 1, wherein a rotational speed of the compressor is controlled by the compressor control device in order to control the compressor capacity.

4. The method as claimed in claim 1, wherein a rate of charging of the compressor is controlled by the compressor control device by means of a variable intake throttling device in order to control the compressor capacity.

5. The method as claimed in claim 1, wherein air throughput through the condenser is controlled by the condenser control device in order to control the condenser capacity by controlling a rotational speed of the ventilating fan.

6. The method as claimed in claim 1, wherein air throughput through the evaporator is controlled by the evaporator control device by controlling the rotational speed of the blower in order to control the evaporator capacity.

7. The method as claimed in claim 1, wherein the evaporator control device comprises at least one of a throttle device and an injection valve that controls refrigerant flow in order to influence the evaporator capacity.

8. The method as claimed in claim 3, wherein the compressor control device controls at least one of a belt drive of a speed-controlled electric motor and a planetary gear of a controllable hydrostatic drive in order to control compressor speed.

9. The method as claimed in claim 5, wherein the ventilating fan speed is controlled by means of at least one of an electrically controllable viscous clutch, an electromagnetic clutch, a speed-controlled electric motor and a hydrostatic drive.

10. The method as claimed in claim 9, wherein the control characteristic for controlling the ventilating fan speed is at least one of a discontinuous, multi-stage and continuous control.

11. The method as claimed in claim 6, wherein the control characteristic for controlling at least one of the ventilating fan drive and the blower is quasi-continuous, a pulsing frequency of the signal being <1000 Hz, preferably <100 Hz.

12. The method as claimed in claim 5, wherein the ventilating fan is hydrostatically driven and, for the purpose of controlling the ventilating fan speed, the electronic control circuit supplies appropriate output signals via a power amplifier to an electromechanical actuator which acts on a control valve of the hydrostatic drive system.

13. The method as claimed in claim 7, wherein at least one of the throttle device and the injection valve can be electrically controlled, the control being one of continuous and quasi-continuous, and the throttle device being driven by means of pulse-width modulated pulses in the case of the quasi-continuous control.

14. The method as claimed in claim 1, wherein the parameter indicative of refrigerating capacity requirement is determined in dependence on the signals of at least one internal space temperature sensor, outside temperature sensor, set point adjuster, moisture sensor and a solar irradiation sensor.

15. The method as claimed in claim 1, further comprising the steps of measuring suction pressure by means of a pressure sensor to determine evaporator icing and converting the suction pressure into an electrical variable by means of a signal converter.

16. The method as claimed in claim 1, further comprising the steps of measuring at least one of the temperature and pressure of the refrigerant and the surface temperature in a evaporator network and the air outlet temperature downstream of the evaporator as a measure of evaporator icing and supplying a corresponding electrical signal to the electronic control circuit.

17. The method as claimed in claim 1, further comprising the, steps of measuring the pressure existing on a high-pressure side which is indicative of the final compression pressure, by means of a pressure sensor and supplying a corresponding electrical signal from the pressure sensor to the electronic control circuit.

18. The method as claimed in claim 1, further comprising the step of determining the temperature of the refrigerant on a high-pressure side of the compressor which is indicative of the final compression temperature.

19. The method as claimed in one of claim 1, further comprising the steps of measuring the pressure and the temperature on a suction side of the compressor which are indicative of the risk of a hydraulic shock and of supplying electrical signals corresponding to these values to the control circuit.

20. The method as claimed in claim 1, further comprising the steps of determining a rotational speed of a driving engine of the vehicle by means of a sensor device and of supplying a signal indicative of rotational speed to the electronic control circuit, wherein the electronic control circuit determines when a predetermined rotational speed is exceeded and, in addition, calculates the quantity of acceleration from two values for the engine speed which in each case follow each other in time.

21. The method as claimed in claim 1, further comprising the steps of detecting at least one of a position and a movement of an accelerator pedal with a sensor and supplying a corresponding signal to the electronic control circuit.

22. The method as claimed in claim 14, wherein the electronic control circuit generates the output signals for driving the drive devices based on the values of at least one of the coolant temperature of the engine coolant, the compressor speed, the rotational speed of the ventilating fan associated with the condenser and of the blower speed associated with the evaporator.

23. The method as claimed in claim 14, wherein the electronic control device generates the output signals for driving the device devices based on the values of at least one of the oil temperature of the engine oil, of the transmission oil, of the charging air temperature and of the dynamic pressure, the latter being derived from the driving speed.

24. The method as claimed in claim 21, wherein the electronic control circuit determines from the signal of the sensor which detects at least one of the position the movement of an accelerator pedal and from the signal of an engine speed sensor, the operating phase of an overrun mode and controls the air conditioning system to full capacity in these operating phases.

25. A motor vehicle air conditioning system comprising:
a refrigeration circuit that includes at least one capacity controlled refrigerant compressor;
a condenser;
an evaporator and a throttle device for refrigerant arranged upstream of the evaporator;
a ventilating fan for providing air flow to the condenser;
a blower for generating an airstream through the evaporator;
sensor means for sensing the compressor capacity, the condensor capacity and the evaporator capacity;
an electronic control circuit, responsive to the operation of the sensor means, for generating control signals; and
control devices, responsive to the control signals generated by the electronic control circuit, for controlling the compressor capacity, the condenser capacity and the evaporator capacity in mutual dependence on one another.

26. A motor vehicle air conditioning system as claimed in claim 25, wherein said sensor means comprises a first speed sensor for sensing a rotational speed of the compressor, a hot gas temperature sensor, a first temperature sensor which detects the injection temperature of the refrigerant in the evaporator, a second temperature sensor which detects the temperature of the refrigerant on a suction side of the evaporator, and a second speed sensor for detecting the speed of the condenser ventilating fan.

27. Motor vehicle air conditioning system as claimed in claim 25, wherein the evaporator comprises two functionally parallel-connected evaporators having one injection valve each, and an electrically actuatable blocking valve which is connected to the electronic control circuit, arranged in the refrigerant line in front of one of the injection valves.

28. Motor vehicle air conditioning system as claimed in claim 27, wherein a refrigerant branch leading to each parallel-connected evaporator is blocked by the injection valve corresponding to the particular parallel connection evaporator when the injection valve is driven by the electronic control circuit.

29. Motor vehicle air conditioning system as claimed in claim 27, further comprising a second condenser provided in parallel with the condenser and a blocking valve located in series with the second parallel condenser.

30. Motor vehicle air conditioning system as claimed in claim 25, further comprising a second condenser connected in series with the condenser and a bypass line bypassing the second condenser, into which a blocking valve is connected.

31. Motor vehicle air conditioning system as claimed in claim 29, further comprising an evaporator blower associated with each parallel-connected evaporator and an additional ventilating fan associated with the second condenser.

32. Motor vehicle air conditioning system as claimed in claim 26, wherein said sensor means further comprises:
at least one internal space temperature sensor,
an outside temperature sensor,
a set point adjustor,
a solar irradiation sensor, and
a moisture sensor.

33. Motor vehicle air conditioning system as claimed in claim 32, wherein said sensor means further comprises:
an engine speed sensor,
a temperature sensor for the cooling water of the engine,
a third temperature sensor for the engine oil, and
a fourth temperature sensor for the transmission oil.

34. Motor vehicle air conditioning system as claimed in claim 25, further comprising a sensor coupled to an accelerator pedal, the sensor being designed in such a manner that it detects the travel of the accelerator pedal as an input variable and its output supplies an electrical signal.

35. Motor vehicle air conditioning system as claimed in claim 25, wherein said capacity controlled refrigerant compressor comprises a compressor, a suction pressure valve, a high-pressure valve, a control piston for influencing a geometric delivery volume of the compressor and a controllable compressor clutch.

36. The method as claimed in claim 1, wherein, in order to control the compressor capacity, the compressor control device changes a geometric delivery volume of the compressor by controlling a closing time of a compression space.

37. The method as claimed in claim 1, wherein air throughput through the condenser is controlled by the condenser control device in order to control the condenser capacity by means of a louvered shutter operated by an actuating motor.

* * * * *